July 11, 1950
T. KLAVON
2,514,449
VANE TYPE HYDRAULIC CLUTCH
Filed Sept. 4, 1945
4 Sheets-Sheet 1
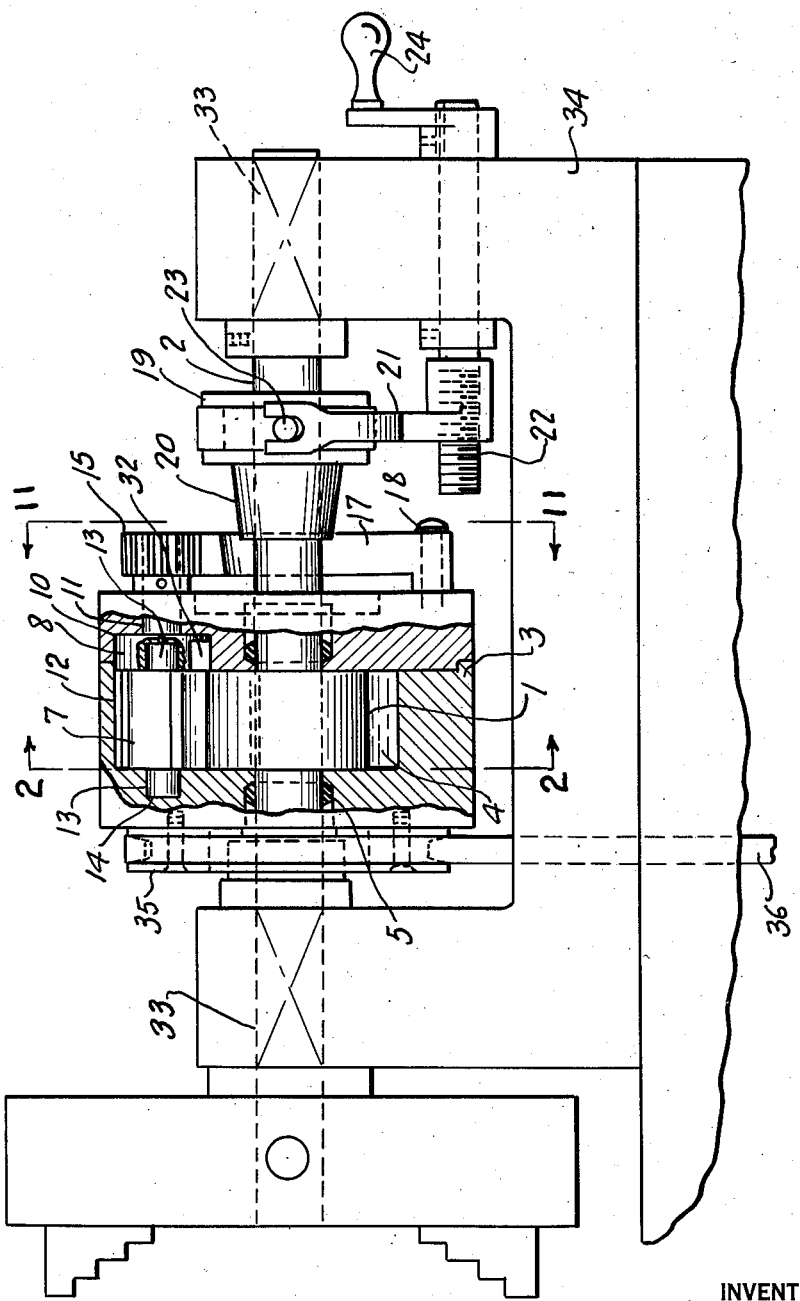
INVENTOR
Theodore Klavon
BY
Barnes, Kisselle, Laughlin & Raisch
ATTORNEYS.

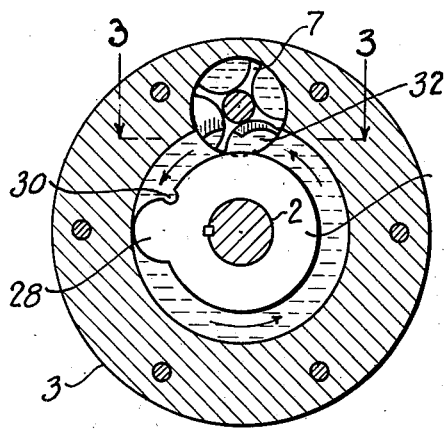
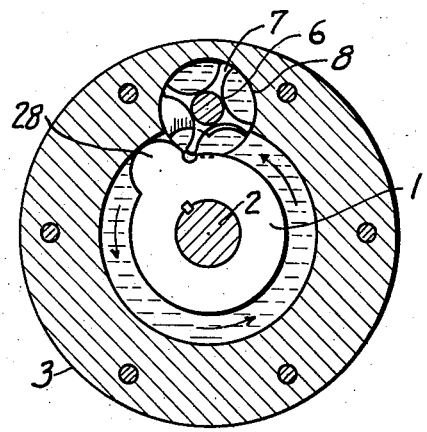
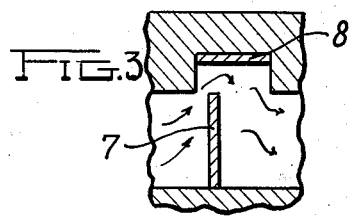
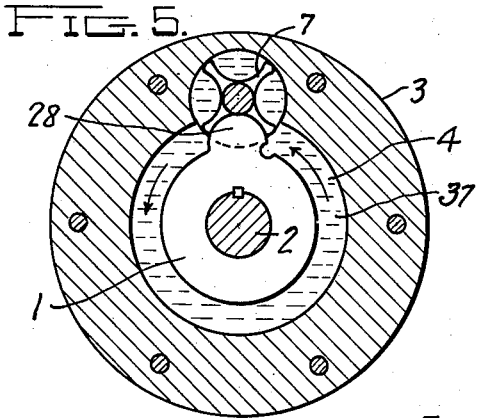
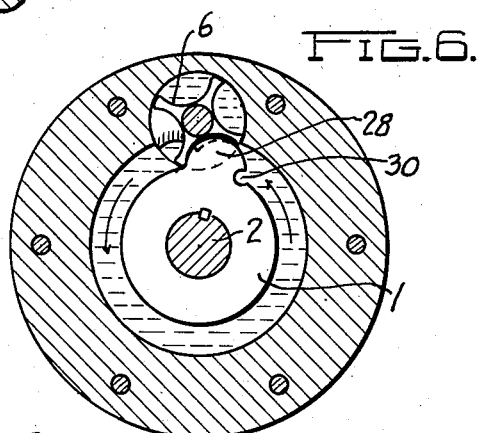
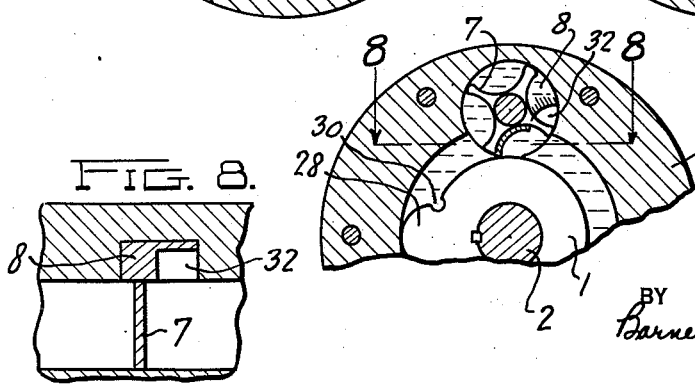

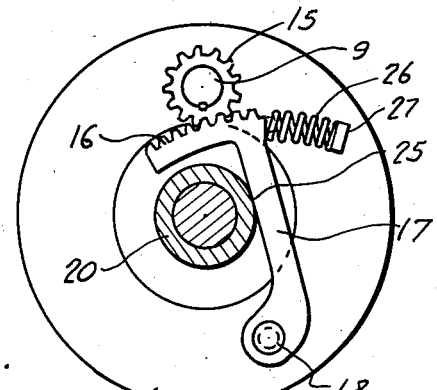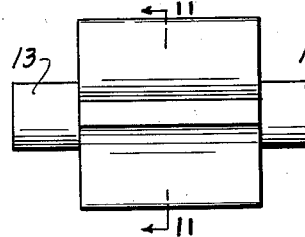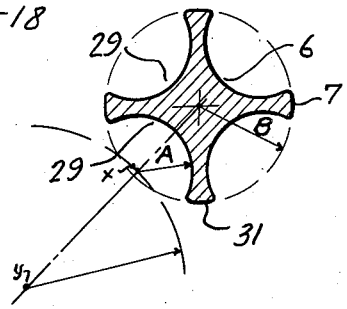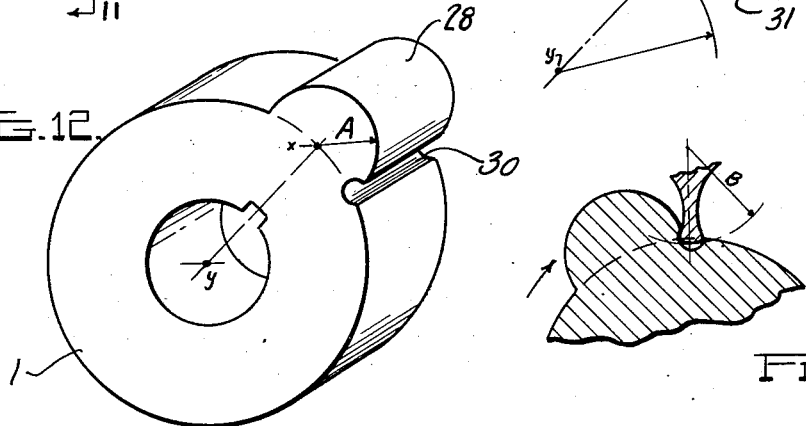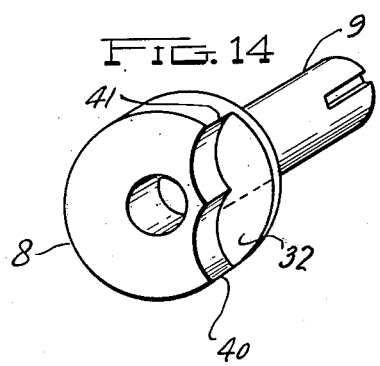

July 11, 1950
T. KLAVON
2,514,449
VANE TYPE HYDRAULIC CLUTCH
Filed Sept. 4, 1945
4 Sheets-Sheet 4
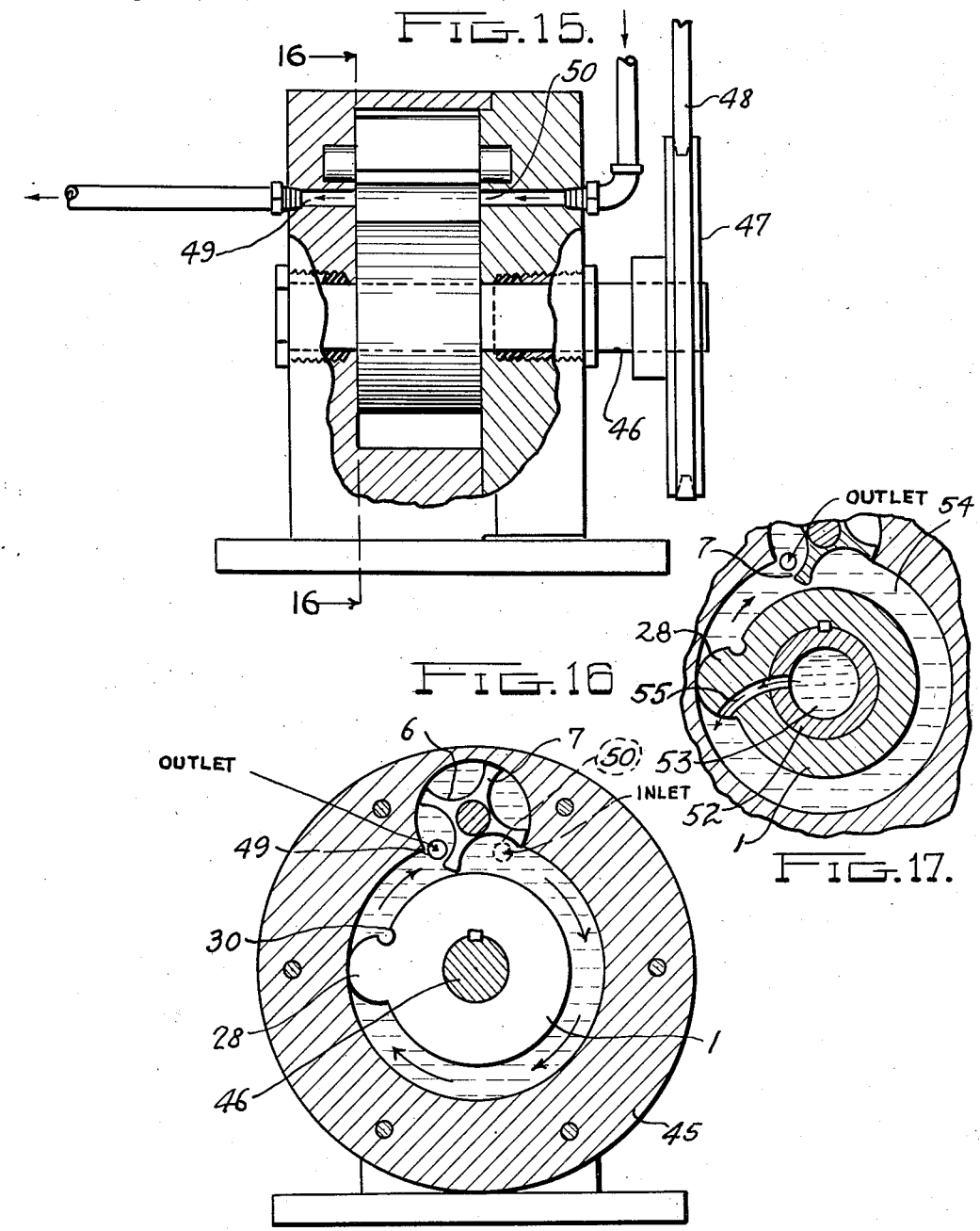
INVENTOR
Theodore Klavon
BY
Barnes, Kisselle, Laughlin & Raisch
ATTORNEYS.

Patented July 11, 1950

2,514,449

UNITED STATES PATENT OFFICE 2,514,449

VANE TYPE HYDRAULIC CLUTCH

Theodore Klavon, Jackson, Mich.

Application September 4, 1945, Serial No. 614,413

1 Claim. (Cl. 192—61)

This invention relates to a hydraulic mechanism which can be used as a variable speed torque transmission, as a hydraulic pump and also as a hydraulic brake.

It is an object of this invention to produce a hydraulic mechanism of the above described type which is simple in structure and reliable and efficient in operation.

Fig. 1 is an assembly view partly in section of my mechanism when used as a variable speed transmission.

Fig. 2 is a section along the line 2—2 of Fig. 1.

Fig. 3 is a section along the line 3—3 of Fig. 2.

Figs. 4, 5, 6 and 7 are sections similar to Fig. 2 but showing the driving and driven members of the transmission in different operative positions.

Fig. 8 is a detail of the valve taken along the line 8—8 of Fig. 7.

Fig. 9 is a detail of the bypass valve regulating mechanism.

Fig. 10 is a detail of the rotary vane.

Fig. 11 is a section of the vane taken along the line 11—11 of Fig. 10.

Fig. 12 is a detail perspective of the driven rotor.

Fig. 13 is a fragmentary detail of the driven rotor and vane.

Fig. 14 is a perspective of the bypass valve.

Fig. 15 is an assembly view partly in section showing my hydraulic mechanism when used as a liquid pump.

Fig. 16 is a section along the line 16—16 of Fig. 15, and Fig. 17 shows a modified form of pump inlet.

The parts of my hydraulic mechanism are as follows: driven rotor 1 keyed on shaft 2, driving member 3 having a cylindrical bore or cavity 4, bearings 5 which support driving member 3 for rotation upon shaft 2, vane 6 having a plurality of blades 7, bypass valve 8 having a shaft 9. Bypass valve 8 and shaft 9 are journalled in cylindrical openings 10 and 11 in driving member 3 coaxial with opening 12 in driving member 3 in which vane 6 is rotatably supported. Vane 6 is provided with stub shafts 13 one of which is journalled in valve 8 and the other of which is journalled in bore 14 in driving member 3. The outer end of valve shaft 9 has affixed thereon a gear wheel 15 which meshes with a rack 16 carried on arm 17 and pivoted as at 18 on driving member 3. Collar 19 and conical sleeve 20 are slidably mounted upon shaft 2 and journalled on shaft 2 so that shaft 2 rotates in, and relative to, sleeve 20 and collar 19 which are integral. Collar 19 is adjusted longitudinally on shaft 2 by means of yoke 21 having a screw fit on screw 22 and pins 23 fixed on collar 19. Screw 22 is turned by crank handle 24. Conical sleeve 20 engages arm 17 as at 25 so that adjustment of sleeve 20 along shaft 2 causes rack 16 to pivot about pivot 18 and thereby rotate gear 15 and adjust bypass valve 8 to increase or decrease to size of the bypass orifice. Compression spring 26 is mounted between one end of rack 16 and anchor 27 on driving member 3.

Driven member 1 is provided along its periphery with a semi-cylindrical projection 28 having a radius A which is identical with radius A of semi-cylindrical cavities 29 in vane 6. Rotor 1 is also provided with a groove 30 along the lower edge of projection 28 for receiving the outer ends 31 of blades 7. Radius B of vane 6 is greater than radius A of projection 28 so that groove 30 is essential to accommodate the outer ends 31 of blades 7. Thus, the bottom of groove 30 is positioned from the center of vane 6 a distance equal to radius B whenever groove 30 is in line with the axial centers of rotation of driven member 1 and vane 6. This has the effect of permitting rotor 1 to rotate only in one direction relative to vane 6 as explained below. Valve 8 is provided with a cut-out or relieved portion 32 which serves as a bypass passageway from one side of blades 7 to the other.

For purposes of description and not by way of limitation, my hydraulic mechanism is shown as a variable speed transmission for operation of a lathe. To this end shaft 2 is journalled as at 33 in frame 34 and driving member 3 has fixed thereto a pulley 35 which is driven by a belt 36 by any suitable source of power, such as by an electric motor. Since I have shown my device as a variable speed transmission, the outer member 3, for purposes of description, is the driving member whereas rotor 1 is the driven member. The diameter of cylindrical cavity 4 is greater than the outside diameter of rotor 1. The space 37 between rotor 1 and driving member 3 and the space in cylindrical cavity 4 not displaced by vane 6 is filled with a hydraulic liquid such as oil. The oil is locked in chamber 37 and cavity 12. Vane 6 is journalled in driving member 3 so that its axis of rotation is spaced from the circumference of driven member 1 a distance less than radius B. Therefore, vane 6 is not free to rotate because the outer edge 31 of blade 7 will contact and slide along the circumference of rotor 1. As shown in Fig. 2, valve 8 has been adjusted so that bypass passageway 32 is wide open. This permits driving member 3 to rotate freely about driven member 1. To effect a driving relation between members 3 and 1, valve 8 is moved from wide open toward closed position. As driving member 3 rotates in the direction of the arrow, Figs. 2 to 6, liquid is trapped in cavity 37 between blade 7 and projection 28 but is gradually bypassed through passageway 32 so that driving member 3 rotates faster than driven member 1. The liquid trapped between projection 28 and blade 7 transmits the driving torque from member 3 to member 1.

Since member 3 rotates relatively faster than member 1, vane 6 eventually reaches projection 28 whereupon blade 7, which is sliding along the circumference of rotor 1, moves into projection 30 and permits projection 28 to move to the other side of center of vane 6 thus rotating vane 6 one-quarter turn. This is nicely illustrated in Figs. 2 through 6 and also Fig. 13. Each time vane 6 reaches projection 28 it is indexed or turned one-quarter turn. Vane 6 cooperates with projection 28 to trap fluid in the chamber between these two elements and the rate at which the liquid is exhausted or bypassed from the space between blade 7 and projection 28 determines the driving ratio between driving member 3 and driven member 1. The adjusting of valve 8 so that either end 40 or 41 of bypass passageway 32 approaches or is moved closer to the circumference of driven member 1 increasingly restricts the bypass of fluid around vane 6 and increases the driving speed of member 1 with respect to driving member 3 so that eventually when bypass passageway 32 is closed entirely, Fig. 7, a one to one or direct driving ratio is effected between driving member 3 and driven member 1.

It is evident that the sliding of conical sleeve 20 along shaft 2 swings rack 16 which in turn causes gear 15 and rotary valve 8 to rotate to vary the adjustment of bypass passageway 32.

When my device is used as a variable speed transmission it is obvious that member 1 can be the driving member in which case element 3 will be the driven member. When my device is used as a brake, then the braking effect will increase as the bypass passageway is restricted and the bypass passageway 32 will be of such size that when valve 8 is wide open there will be no entrapment of liquid between projection 28 and vane 6 and thus no braking effect.

In Figs. 15 and 16 I have shown my device used as a pump. When used as a pump my device has no need for valve 8 so this element is dispensed with. Instead of making the outside member 3 the driven member, I utilize the outside member 45 (corresponding to member 3) as the stationary pump housing and member 1 now becomes the driven member. Rotor 1 is keyed upon shaft 46 driven by pulley 47 and driving belt 48. Housing 45 is provided with an outlet port 49 and an intake port 50 positioned on opposite sides of a line passing through the center of vane 6 and shaft 46. As rotor 1 rotates in the direction of the arrow, Fig. 16, the liquid between projection 28 and blade 7 is exhausted out of port 49 and liquid is drawn in through intake port 50. When projection 28 reaches blade 7 the outer end 31 moves into recess or groove 30 and vane 6 is indexed through a quarter revolution and the pump starts a new cycle. Here again vane 6 cannot rotate except when groove 30 reaches a position in line with the centers of rotation of vane 6 and shaft 46 and edge 31 of one of the blades 7 will ride along the outer circumference of rotor 1 and entrap fluid between projection 28 and blade 7 until the blade 7 is free to move into groove 30 and permit projection 28 to pass by vane 6.

In Fig. 17 I have merely illustrated a modified form of pump inlet. In this case shaft 52, on which rotor 1 is keyed, is hollow to provide an intake passageway 53 which is connected with the source of fluid being pumped. Passageway 53 connects with chamber 54 through a series of inlet ports 55 passing through shaft 52 and the trailing or rear portion of projection 28. This modified form of pump operates the same as that shown in Figs. 15 and 16 except that the liquid is drawn through hollow shaft 52 and ports 55 into chamber 54 between blade 7 and projection 28.

Vane 6, for descriptive purposes, is shown with four blades 7, but it is understood that the number of blades on vane 6 is optional and can be varied.

I claim:

A hydraulic mechanism comprising in combination a driving and a driven member, one of said members having a cylindrical chamber therein and the other of said members being positioned within said chamber for rotation relative to the other of said members, the inner member being cylindrical and having a radius less than the radius of said chamber to provide a space adapted to receive fluid between said members, one of said members having a projection fixed thereto and adapted to have a sealing contact with the other of said members, the other of said members having a multi-bladed rotary vane journalled therein and positioned so that one of the blades of said vane slidably contacts the circumference of the other member, the axis of rotation of said vane being positioned a distance from the circumference of the member against which the vane seals less than the radius of the blade whereby during the relative rotation of the driving and driven members fluid is trapped between the projection and the vane, a transverse recess in the circumference of the member carrying said projection adjacent the base of said projection, said recess having sufficient depth to accommodate the blades of said vane and thereby permit said projection to rotate by said vane on each revolution whereby the vane is indexed, and a bypass passageway about said vane permitting fluid to pass from one side of the blade of said vane which is in contact with the circumference of said other member to the other during the relative rotation of said driving and driven members, said bypass passageway communicating with an outlet and an inlet in said chamber positioned between said vane and the circumference of said other member and arranged so that said inlet and outlet will always be adjacent to, and on opposite sides of, the vane blade which is in contact with the said circumference of the other member, and means for varying the effective size of said bypass passageway to vary the driving ratio between said driving and driven members.

THEODORE KLAVON.

REFERENCES CITED

The following references are of record in the file of this patent:

UNITED STATES PATENTS

| Number | Name | Date |
|---|---|---|
| 59,792 | Drawbaugh | Nov. 20, 1866 |
| 578,938 | Marburg, Jr. | Mar. 16, 1897 |
| 1,155,314 | Hungerford | Sept. 28, 1915 |
| 1,174,853 | Goldman et al. | Mar. 7, 1916 |
| 1,238,467 | Wherry | Aug. 28, 1917 |
| 2,292,987 | Berry | Aug. 11, 1942 |